(12) United States Patent
Menges et al.

(10) Patent No.: US 6,715,920 B2
(45) Date of Patent: Apr. 6, 2004

(54) LINEAR ROLLING BEARING ELEMENT

(75) Inventors: Martin Menges, Homburg (DE); Thomas Elicker, Ottweiler (DE); Ralf Franz, Kaiserslautern (DE)

(73) Assignee: INA Schaeffler KG (DE)

( * ) Notice: Subject to any disclaimer, the term of this patent is extended or adjusted under 35 U.S.C. 154(b) by 0 days.

(21) Appl. No.: 10/161,506

(22) Filed: May 30, 2002

(65) Prior Publication Data
US 2002/0181810 A1 Dec. 5, 2002

(30) Foreign Application Priority Data
May 31, 2001 (DE) .......................... 101 26 439

(51) Int. Cl.[7] .............................................. F16C 29/06
(52) U.S. Cl. .................. 384/45; 384/13; 384/15
(58) Field of Search ........................ 384/13, 15, 43, 384/44, 45

(56) References Cited

U.S. PATENT DOCUMENTS

| 5,308,165 A |   | 5/1994  | Kamimura ............... 384/45 |
|---|---|---|---|
| 5,374,126 A | * | 12/1994 | Akasako et al. ........... 384/15 |
| 5,380,096 A | * | 1/1995  | Tanaka ..................... 384/13 |
| 5,380,097 A | * | 1/1995  | Tanaka ..................... 384/13 |
| 5,399,023 A | * | 3/1995  | Winkelmann et al. ...... 384/13 |
| 5,454,645 A | * | 10/1995 | Tsukada .................... 384/15 |
| 5,584,581 A | * | 12/1996 | Keller et al. ............... 384/45 |
| 6,024,490 A | * | 2/2000  | Shirai ....................... 384/13 |
| 6,203,199 B1 | * | 3/2001 | Pfeuffer ..................... 384/45 |

FOREIGN PATENT DOCUMENTS

| DE | 4141038  | 6/1993  |
|---|---|---|
| DE | 4331014  | 3/1995  |
| DE | 19525219 | 1/1997  |
| DE | 19920477 | 11/2000 |
| JP | 11022726 | 1/1999  |

* cited by examiner

Primary Examiner—Thomas R. Hannon
(74) Attorney, Agent, or Firm—Muserlian, Lucas and Mercanti

(57) ABSTRACT

A linear rolling bearing element for mounting on a running surface of a guide rail, said element having a carrier body that comprises, for a rolling element circuit, a load-bearing zone and a return channel that are parallel to a direction of movement of the carrier body while being connected to each other by two deflecting channels disposed in head pieces that are arranged on ends of the carrier body. The head pieces comprise lubricant ducts, and a rolling element guiding means in the form of a plastic coating is arranged in the load-bearing zone, the return channel and the deflecting channels. Each head-piece is formed by a cage arranged on an end of the carrier body and by a one-piece sealing plate comprising lubricant ducts, said plate being adapted to and disposed on the cage.

5 Claims, 4 Drawing Sheets

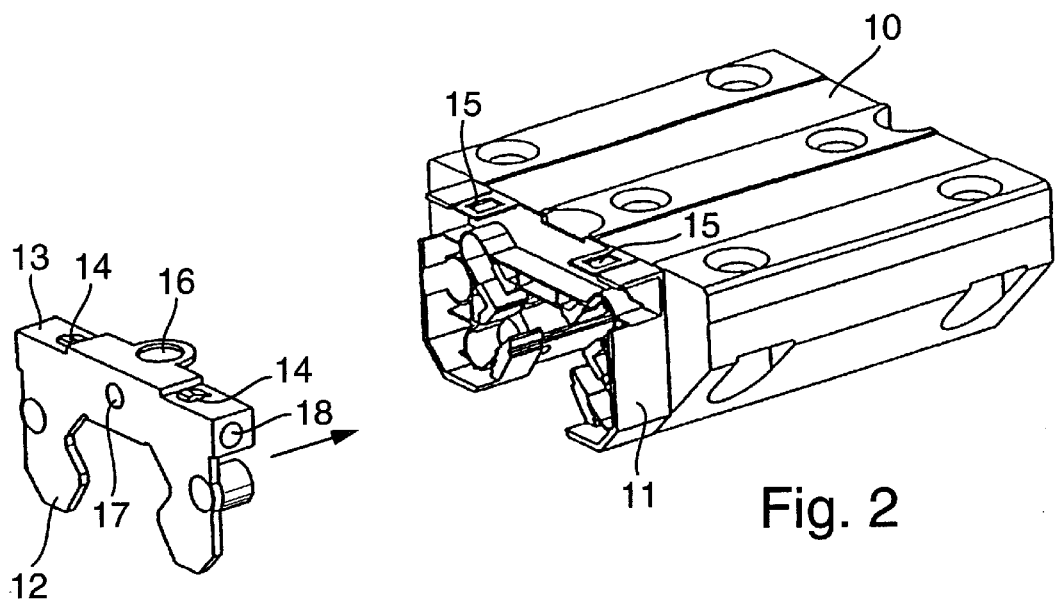
Fig. 1
Fig. 2
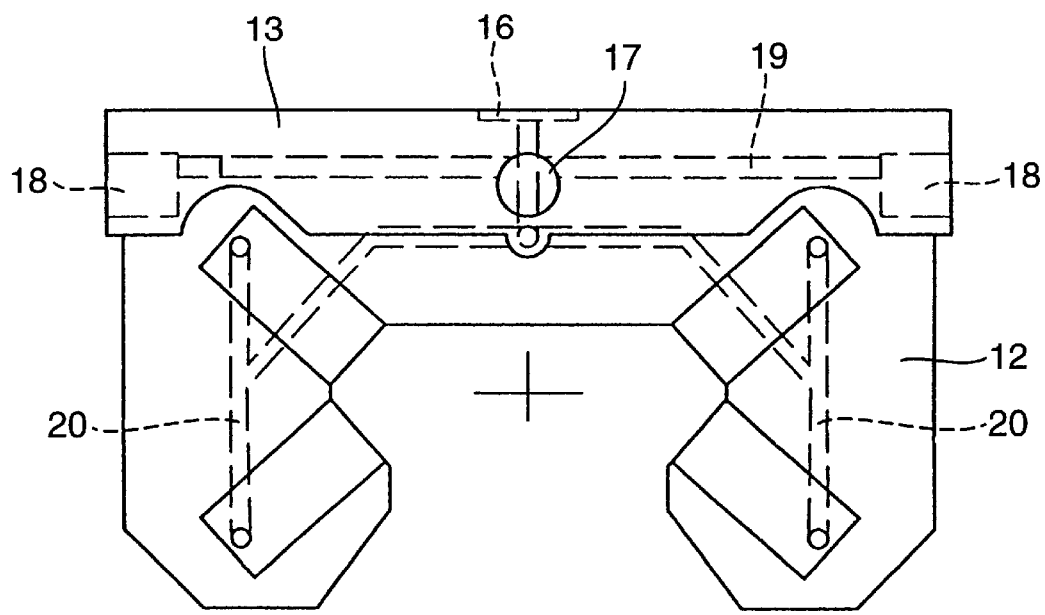
Fig. 3

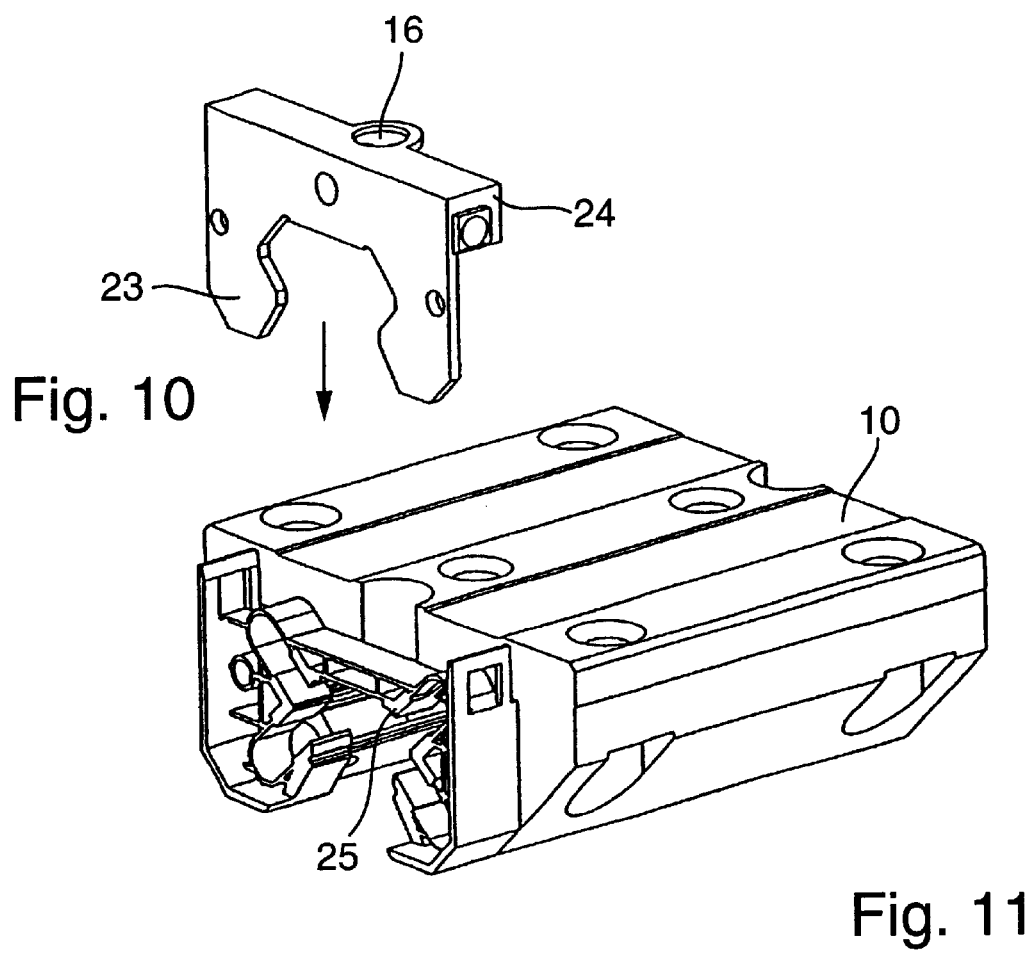

LINEAR ROLLING BEARING ELEMENT

FIELD OF THE INVENTION

The invention concerns a linear rolling bearing element for mounting on a running surface of a guide rail, said element having a carrier body comprising, for a rolling element circuit, a load-bearing zone and a return channel that are parallel to a direction of movement of the carrier body while being connected to each other by two deflecting channels disposed in head pieces that are arranged on ends of the carrier body, said head pieces comprising lubricant ducts, while a rolling element guiding means in form of a plastic coating is arranged in the load-bearing zone, the return channel and the deflecting channels.

In a bearing element of the pre-cited type known from the document DE 43 31 014 C2, an inner retention plate and an outer retention plate form an assembled unit that serves to retain a front wiper and also comprises channels for the distribution of lubricant.

OBJECTS OF THE INVENTION

It is an object of the invention to facilitate and quicken the mounting of the guide carriage formed by the carrier body and the head pieces.

This and other objects and advantages of the invention will become obvious from the following detailed description.

SUMMARY OF THE INVENTION

The invention achieves the above objects by the fact that each head piece is formed by a cage arranged on an end of the carrier body and by a one-piece sealing plate comprising lubricant ducts, said plate being adapted to and disposed on the cage. This results in a reduction of the number of components making up the bearing element so that less screw connections are required compared to prior art bearing elements. Besides this, the number of joints are also reduced, so that dirt particles from the outside cannot enter the structure so easily. The fact that the plastic component of the carrier body, designated as a cage, is adapted in the deflecting region to the sealing plate that acts as a lubricant distributor, results in an improved sealing against the entry of dirt particles from the outside. The deflecting regions of the bearing element of the invention are fully enclosed on all sides i.e., they are encapsulated. The importance of such an arrangement increases when used for the operation of guide carriages with blocking air (internal overpressure).

A sealing strip comprising a lubricant duct can be integrally formed on the sealing plate of the bearing element. The sealing strip can comprise re-lubricating bores through which the lubricant duct of the sealing strip and the lubricant ducts of the sealing plate are open toward the exterior. The sealing strip can comprise an upper re-lubricating bore and/or two side lubricating bores, and can further comprise an end re-lubricating bore.

For forming the deflecting channels, deflecting cups can be fixed on the inner surface of the sealing plate. Further, an elastic separating layer can be arranged between the inner surface of the sealing plate and each deflecting cup.

The two sealing plates of the bearing element of the invention are arranged mirror-inverted on the carrier body and are connected to each other by two longitudinal seals that are inserted or pushed into appropriately configured receptions of the carrier body.

The sealing plate can be positioned and fixed on its associated and appropriately adapted cage on the carrier body by integrated clips, clamping lugs, retaining lugs or bores, so that screw connections are not required for this purpose.

For sealing the deflecting zones of the carrier body from the outside, sealing elements, for example an O-ring seal, can be disposed in the sealing plates.

The invention will now be described more closely with reference examples of embodiment illustrated in the appended drawings.

BRIEF DESCRIPTION OF THE DRAWINGS

FIG. 1 is a perspective view of a sealing plate for a bearing element of the invention;

FIG. 2 is a perspective view of a carrier body adapted to receive the sealing plate of FIG. 1, for a bearing element of the invention;

FIG. 3 is a schematic representation of the inner surface of the sealing plate of FIG. 1;

FIG. 10 is a perspective view of a further sealing plate for a bearing element of the invention;

FIG. 11 is a perspective view of a further carrier body adapted to receive the sealing plate of FIG. 10, for a bearing element of the invention.

DETAILED DESCRIPTION OF THE INVENTION

Figure 4:
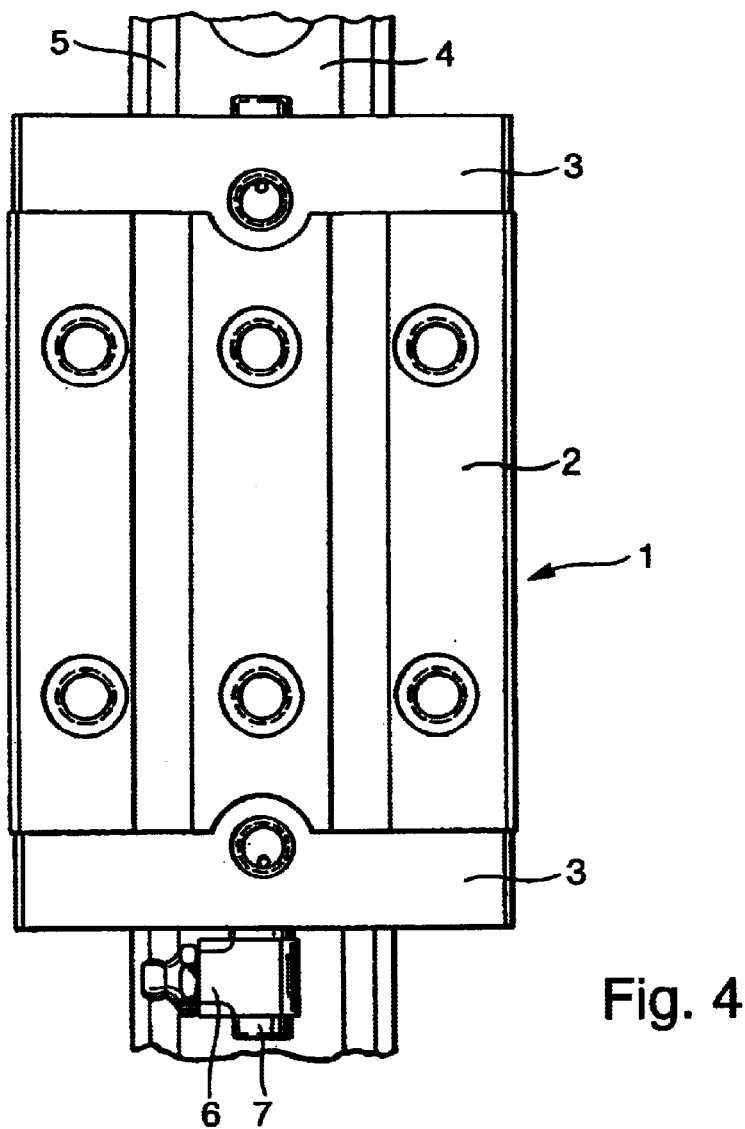
FIG. 4 is a top view of a prior art bearing element arranged for longitudinal displacement on a guide rail.
Figure 5:
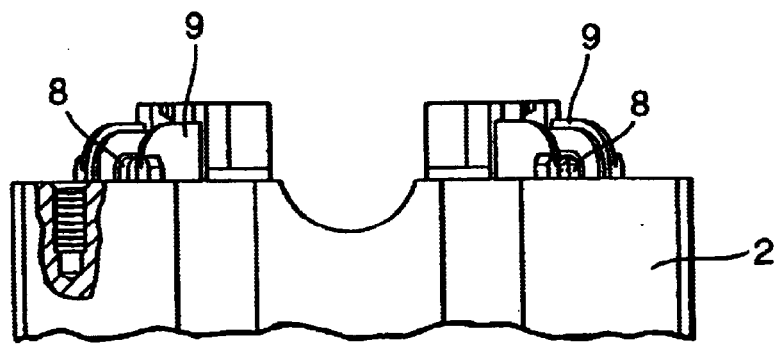
FIG. 5 is an enlarged view of an end region of the carrier body of the bearing element of FIG. 4, with the head piece omitted.

The prior art bearing element 1 shown in FIGS. 4 and 5 comprises two head pieces 3 that are fixed on ends of a carrier body 2. Each head piece 3 comprises a deflecting body for deflecting rolling elements out of a load-bearing region into a return region, or vice versa. The bearing element 1 with its two head pieces 3 can travel in a straight line along a guide rail 4 comprising running surfaces 5. A lubricant carrier 6 having a lubricant nipple is fixed with a screw 7 on one of the head pieces 3. The incoming lubricant from the lubricant nipple is conveyed to the rolling elements through lubricant ducts that are arranged in the head piece 3.

As can be seen in FIG. 5, guide bars for the rolling elements project in the deflecting region from the ends of the carrier body 2 and form, together with deflecting segments 8, guide rims 9 that assure a precise guidance of the rolling elements in the deflecting region.

In a bearing element of the invention, a rolling element guiding means in the form of a plastic coating is arranged in the load-bearing zone, the return channel and the deflecting channels.

Figure 6:
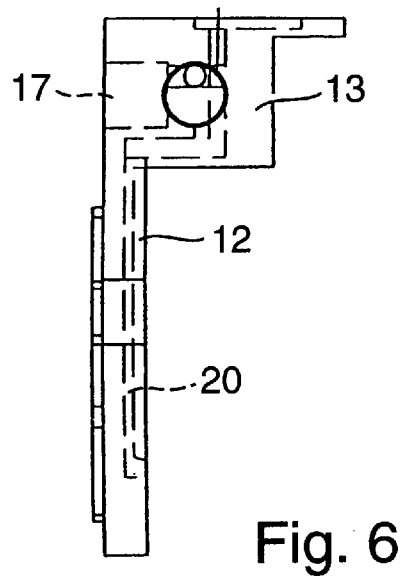
FIG. 6 shows a side view of the sealing plate of a bearing element of the invention.
Figure 8:
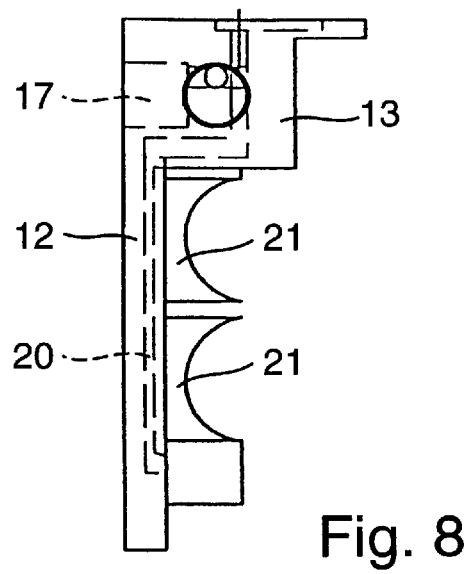
FIG. 8 is a side view of a sealing plate of a bearing element of the invention comprising deflecting cups.
Figure 7:
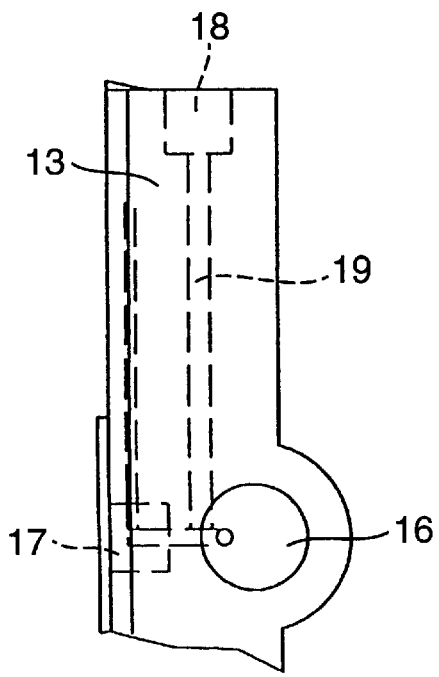
FIG. 7 shows the sealing plate of FIG. 6 in a top view.
Figure 9:
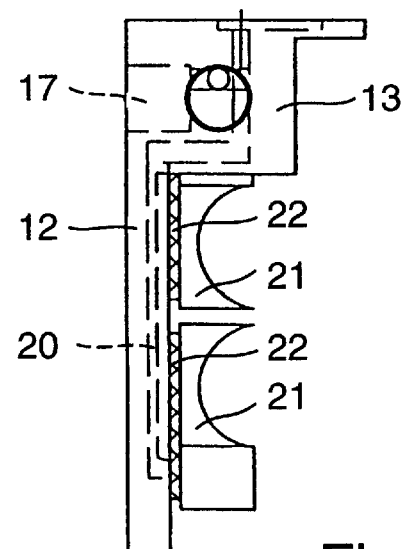
FIG. 9 is a side view of a sealing plate of a bearing element of the invention comprising deflecting cups and elastic separating layers.

As shown in FIGS. 1 and 2, in a bearing element of the invention, each head piece comprises a cage 11 arranged on one end of the carrier body 10, and a sealing plate 12. In the present example, the sealing plate 12 is moved parallel to the longitudinal direction of the guide rail 4 in arrow direction towards the carrier body 10 and then placed on the cage 11. A sealing strip 13 is formed integrally on the upper end of the sealing plate 12. The sealing strip 13 comprises retaining knobs 14 that lock into recesses of retaining tabs 15 of the cage 11. The sealing plate 12 with the integrally formed sealing strip 13 comprises an upper re-lubricating bore 16, an end re-lubricating bore 17 and two side re-lubricating bores 18, of which only one is visible in FIG. 1. In the schematic representations of FIGS. 3, 6 and 7, it can be seen that the bores 16, 17 and 18 of the sealing plate 12 communicate with a lubricant duct 19 in the sealing strip 13 and are also connected to lubricant ducts 20 in the sealing plate 12. The lubricant is conveyed through the ducts 20 to the deflecting regions and the rolling elements situated therein. In FIG. 8, deflecting cups 21 are fixed on the inner surface of the sealing plate 2, while in FIG. 9, such deflecting cups are connected to the sealing plate 12 through elastic separating layers 22.

The embodiment of the bearing element shown in FIGS. 10 and 11 is a modification of the bearing element of FIGS. 1 and 2. For arranging this modified bearing element on the carrier body 10, the sealing plate 23 with the sealing strip 24 is moved at a right angle to the longitudinal direction of the guide rail 4 in arrow direction towards the carrier body 10 and then plugged onto the cage 25 arranged thereon.

What is claimed is:

1. A linear rolling bearing element for mounting on a running surface of a guide rail, said element having a carrier body comprising for a rolling element circuit, a load-bearing zone and a return channel that are parallel to a direction of movement of the carrier body while being connected to each other by two deflecting channels disposed in head pieces that are arranged on ends of the carrier body, said head pieces comprising lubricant ducts, while a rolling element guide means is arranged in the load-bearing zone, the return channel and the deflecting channels, wherein each head piece is formed by a cage arranged on an end of the carrier body and by a one-piece sealing plate comprising lubricant ducts, said plate being adapted to and disposed on the cage, wherein a sealing strip comprising a lubricant duct is integrally formed on the sealing plate of the bearing element and the sealing strip comprising retaining knobs that lock into recesses of retaining tabs of the cage.

2. A bearing element of claim 1 wherein the sealing strip comprises re-lubricating bores through which the lubricant duct of the sealing strip and the lubricant ducts of the sealing plate are outwardly open.

3. A bearing element of claim 2, wherein the sealing strip comprises at least one of an upper re-lubricating bore and two side lubricating bores, and further comprises and end and re-lubricating bore.

4. A bearing element of claim 1, wherein for forming the deflecting channels, deflecting cups are fixed on an inner surface of the sealing plate.

5. A bearing element of claim 4, wherein an elastic separating layer is arranged between the inner surface of the sealing plate and each deflecting cup.

* * * * *